United States Patent
Nelson, Jr.

(10) Patent No.: US 6,953,494 B2
(45) Date of Patent: Oct. 11, 2005

(54) SORBENTS AND METHODS FOR THE REMOVAL OF MERCURY FROM COMBUSTION GASES

(76) Inventor: Sidney G. Nelson, Jr., 1664 E. Highland Rd., Twinsburg, OH (US) 44087

(*) Notice: Subject to any disclaimer, the term of this patent is extended or adjusted under 35 U.S.C. 154(b) by 0 days.

(21) Appl. No.: 10/430,577

(22) Filed: May 6, 2003

(65) Prior Publication Data

US 2004/0003716 A1 Jan. 8, 2004

Related U.S. Application Data

(60) Provisional application No. 60/377,790, filed on May 6, 2002.

(51) Int. Cl.[7] ................................ B01D 53/04
(52) U.S. Cl. ................ 95/134; 95/58; 95/62; 95/901; 423/210; 502/417; 502/432
(58) Field of Search .................. 95/58, 62, 134, 95/901; 96/108; 210/688; 423/210; 502/417, 432

(56) References Cited

U.S. PATENT DOCUMENTS

| | | |
|---|---|---|
| 1,788,466 A | 1/1931 | Lourens |
| 1,984,164 A | 12/1934 | Stock |
| 2,511,288 A | 6/1950 | Morrell et al. |
| 3,194,629 A | 7/1965 | Dreibelbis et al. |
| 3,662,523 A | 5/1972 | Revoir et al. |
| 3,849,267 A | 11/1974 | Hilgen et al. |
| 3,956,458 A | 5/1976 | Anderson |
| 3,961,020 A | 6/1976 | Seki |
| 4,040,802 A | 8/1977 | Deitz et al. |
| 4,075,282 A | 2/1978 | Storp et al. |
| 4,174,373 A | 11/1979 | Yoshida et al. |
| 4,196,173 A | 4/1980 | deJong et al. |
| 4,394,354 A * | 7/1983 | Joyce ..................... 423/25 |

(Continued)

FOREIGN PATENT DOCUMENTS

| | | |
|---|---|---|
| JP | 49-53590 | 5/1974 |
| JP | 49-53591 | 5/1974 |
| JP | 49-53592 | 5/1974 |
| JP | 49-53593 | 5/1974 |
| JP | 49-66592 | 6/1974 |

(Continued)

OTHER PUBLICATIONS

Bansal R & Donnet, JB, "Active Carbon," Manufacture of Active Carbons, Marcel Dekker, Inc. (New York), (Feb. 9, 1989).

(Continued)

*Primary Examiner*—Robert H. Spitzer
(74) *Attorney, Agent, or Firm*—Hahn Loeser & Parks, LLP; John J. Cunniff

(57) ABSTRACT

A method for removing mercury and mercury-containing compounds from a combustion gas in an exhaust gas system has the steps of providing a mercury sorbent; injecting the mercury sorbent into a stream of the mercury-containing combustion gas for a sufficient time to allow at least an effective amount of the mercury and mercury-containing compounds in the combustion gas to adsorb onto the mercury sorbent, and collecting and removing the mercury sorbent from the combustion gas stream. The mercury sorbent is prepared by treating a carbonaceous substrate with an effective amount of a bromine-containing gas, especially one containing elemental bromine or hydrogen bromide, for a time sufficient to increase the ability of the carbonaceous substrate to adsorb mercury and mercury-containing compounds. The points of injecting and collecting and removing the mercury sorbent may be varied, depending upon the exact configuration of the exhaust gas system.

29 Claims, 7 Drawing Sheets

U.S. PATENT DOCUMENTS

| | | | |
|---|---|---|---|
| 4,427,630 A | | 1/1984 | Aibe et al. |
| 4,500,327 A | | 2/1985 | Nishino et al. |
| 4,578,256 A | | 3/1986 | Nishino et al. |
| 4,708,853 A | | 11/1987 | Matviya et al. |
| 4,889,698 A | | 12/1989 | Moller et al. |
| 4,917,862 A | * | 4/1990 | Kraw et al. ..................... 422/4 |
| 5,179,058 A | | 1/1993 | Knoblauch et al. |
| 5,202,301 A | | 4/1993 | McNamara |
| 5,288,306 A | | 2/1994 | Aibe et al. |
| 5,320,817 A | * | 6/1994 | Hardwick et al. .......... 423/237 |
| 5,336,835 A | | 8/1994 | McNamara |
| 5,352,647 A | | 10/1994 | Suchenwirth |
| 5,372,619 A | | 12/1994 | Greinke et al. |
| 5,403,548 A | | 4/1995 | Aibe et al. |
| 5,435,980 A | | 7/1995 | Felsvang et al. |
| 5,505,766 A | | 4/1996 | Chang |
| 5,827,352 A | * | 10/1998 | Altman et al. ................. 95/58 |
| 6,475,461 B1 | | 11/2002 | Ohsaki et al. |
| 6,514,907 B2 | | 2/2003 | Tsutsumi et al. |
| 6,521,021 B1 | | 2/2003 | Pennline et al. |
| 6,533,842 B1 | | 3/2003 | Maes et al. |
| 2001/0002387 A1 | * | 5/2001 | Tsutsumi et al. ........... 502/416 |
| 2003/0161771 A1 | * | 8/2003 | Oehr .......................... 423/210 |
| 2004/0013589 A1 | * | 1/2004 | Vosteen et al. ............. 423/210 |

FOREIGN PATENT DOCUMENTS

| | | |
|---|---|---|
| JP | 51-5586 | 1/1976 |
| JP | 59-10343 | 1/1984 |
| JP | 59-76537 | 5/1984 |
| JP | 59-160534 | 9/1984 |
| JP | 9-239265 | 9/1997 |
| JP | 10-109016 | 4/1998 |

OTHER PUBLICATIONS

Henning, K.–D.; Schafer, S., "Impregnated activated carbon for environmental protection," Gas Separation & Purification, B utterworth–Heinemann Ltd, vol. 7 (No. 4), (Feb. 9, 1993).

Products and Technologies "impregnated Activated Carbon".

KnowHow "Groundwater decontamination Combined Know–How Successful", Norit vol. 6.

Waterlink/Barnebey Sutcliff, "Speciality Impregnated Carbons," Waterlink.

Nucon International, Inc., "Nusorb Mersorb Family of Adsorbents for Mercury Control,".

Vaihtilma White Air Oy, "Gas phase filtration,".

Atsuo Kobayashi, Ph.D., "Japan EnviroChemicals, Ltd. Overview,".

SKC, "The Essential Reference for air sampling," 1997 Comprehensive Catalog & Air Sampling Guide.

United States Environmental Protection, "An Evaluation of Mercury Control Technologies and Costs," Mercury Study Report to Congress, (Dec. 9, 1997).

Aaron J. Teller and Jay M. Quimby, "Mercury Removal from Incineration FLue Gas," Air and Water Technologies Co.

Pratim Bisways and Chaung Yu Wu, "Control of Toxic Metal Emissions from Combustors Using Sorbents: A Review," Journal of the Air & Waster Management Association.

United States Environmental Protection Agency, "Study of Harardous Air Pollutant Emissions from electric Utility Steam Generating Units—Final Report to Congress," EPA–453/R–98–004a.

United States Environmental Protection Agency, "Study of Hazardous Air Pollutant Emissions from Electric Utility Steam Generating Units—Final Report to Congress," EPA–453/R–98–004b.

Carey, T., et al, "Factors Affecting Mercury Control in Utility Flue Gas Using Activated Carbon," ISSN 1047–3289 J. Air & Waste Manage Assoc., Journal of the Air & Waste Management Association, (Dec. 10, 1998).

Dunham, et al, "Investigation of Sorbent Injection for Mercury Control in Coal–Fired Boilers," Energy & Environmental Research Center, University of North Dakota, (Sep. 10, 1998).

Donnet, et al, "Carbon Black," Science and Technology, 2nd ed., Marcel Dekker, Inc. (New York), (Feb. 10, 1993).

Brown, et al, "Introduction to the Air & Waste Management Association's 29th Annual Critical Review," Journal of the Air & Waste Management Asssociation, (Jun. 10, 1999).

Pavlish, et al, "Status Review of Mecury Control Options for Coal–Fired Power Plants," Fuel Processing Technology, Elsevier, (Feb. 10, 2002).

Durham, et al., "Full–Scale Evaluation of Mercury Control by Injecting Activated Carbon Upstream of ESPS," Air Qaulity IV Conference, ADA Environmental Solutions (Littleton, Colorado), (Feb. 10, 2003).

Bustard, et al, "Full–Scale Evaluation of Sorbent Injection FOr Mercury Control on Coal–Fired Power Plants," Air Quality III, ADA Environmental SOlutions, LLC (Arlington, VA), (Sep. 12, 2000).

Livengood, et al, "Development of Mercury Control Techniques for Utility Boilers," Air & Waste Managment Association, (Feb. 10, 1995).

Granite, et al., "Novel Sorbents for Mercury Removal from Flue Gas," National Energy Technology Laboratory, (Apr. 10, 2000).

Vidic, et al, "Vapor–phase elemental mercury adsorption by activated carbon impregnated with chloride and chelting agents," Carbon 39 (2001) 3–14, (Feb. 10, 2001).

Ghorishi, et al, "In–Flight Capture of Emental Mercury by a Chlorine–Impregnated Activated Carbon," Air Waste Management Association Journal (Orlando, FL), (Feb. 10, 2001).

Felsvang, et al, "Activated Carbon Injection In Spray Dryer/ ESP/FF For Mercury and Toxics Control," (Feb. 10, 1993).

Sjostrom, et al, "Full–Scale Evaluation of Mercury Control at Great River Energy's Stanton Generating Station Using Injectied Sorbents and a Spray Dryer/Baghouse," Air Quality III Conference, Session A3b, (Feb. 10, 2002).

Livengood, et al, "Enhanced Control of Mercury Emissions Through Modified Speciation," Argone National Laboratory (Argonne, IL), (Feb. 10, 1997).

* cited by examiner

Mercury Breakthrough Curves
with Additional Phosphoric Acid Treatment

Mercury Breakthrough Curves
for PAC with Various Halogen Treatments

Mercury Capacity of PAC at Initial Breakthrough with Simulated Flue Gases

Pleasant Prairie Power Plant
Slipstream Fixed-Bed Testing
300°F Downstream of $SO_3$ Conditioning Duct-Injection Pilot Plant with ESP Lausche Plant Duct-Injection ESP Trials

SORBENTS AND METHODS FOR THE REMOVAL OF MERCURY FROM COMBUSTION GASES

CROSS-REFERENCES TO RELATED APPLICATIONS

This application claims the priority of U.S. Provisional Application No. 60/377,790, filed May 6, 2002, entitled "Methods to Remove Mercury from Combustion Gases," which is hereby incorporated by reference as if fully recited herein.

STATEMENT REGARDING FEDERALLY SUPPORTED RESEARCH OR DEVELOPMENT

The United States Government may own certain rights to present invention pursuant to Air Force Contract No. F08637-95-C6036 and Environment Protection Agency Contract 68D50142, both awarded to Sorbent Technologies Corporation.

BACKGROUND OF THE INVENTION

1. Field of the Invention

This invention relates to the removal of mercury from combustion gas streams and more specifically to the use of halogenated carbon materials to reduce the emissions of mercury from coal-fired power plants.

2. Description of the Related Art

It is well known that mercury is both hazardous and poisonous. Consequently, there is frequently a need to remove it from, for example, the air streams around industrial processes, such as at chlor-alkali plants, or from the air in dental offices using amalgams, where people may be directly exposed to mercury vapor. Similarly, there is a need to sequester mercury from natural gas and hydrocarbon streams, where it corrodes processing equipment; from wastewater streams, where its discharge can contaminate ecosystems; and from the hot combustion-gas emissions of waste incinerators, where it is emitted to the environment to methylate and bio-concentrate up the food chain. Each of these gas or liquid streams has different characteristics that make some mercury removal methods effective and appropriate, but others, ineffective and inappropriate. Consequently, over the years, a multitude of approaches have had to be developed for effectively removing mercury species from various streams. These overall approaches include, among others: liquid scrubbing technologies, homogenous gas-phase technologies, metal amalgamation techniques, and processes utilizing various sorbent materials in different application schemes, with adsorbents optionally impregnated with various reaction aids.

A common recent concern is the mercury emitted from coal-fired power plants. It has been estimated, for example, that about 100,000 pounds of mercury are being emitted into the atmosphere annually in the United States from coal-fired power plants. Capturing and isolating this mercury is a very difficult technical problem because the gas volumes to be processed are great, the gas concentrations of the mercury are low, and the gas temperatures are high. Also, many other complicating compounds are present in the flue gas and multiple mercury species have to be sequestered. Even though many mercury control techniques have already been developed, new means for effectively and economically controlling utility mercury emissions are still needed. After a thorough investigation of the prior art on mercury removal from power-plant gas streams, the U.S. Environmental Protection Agency (EPA) concluded in the Executive Summary to its 1998 Utility Hazardous Air Pollutants (HAPs) Report to Congress that:

"Regarding potential methods for reducing mercury emissions, the EPA has not identified any demonstrated add-on control technologies currently in use in the U.S. that effectively remove mercury from utility emissions." [Page ES-18].

In the past, activated carbons have demonstrated utility for sequestering mercury vapors in some applications. When combined with halogen compounds, the mercury sequestration performance of activated carbons can be improved. In particular, the ability of iodine and iodide impregnations to increase the capacity of granular activated carbons in capturing elemental mercury vapor from air at ambient temperatures has long been known. Stock U.S. Pat. No. 1,984,164, for example, teaches the advantages of loading activated carbon with halogens, particularly iodine, to remove mercury from ambient air and Dreibelbis et al. U.S. Pat. No. 3,194,629, of impregnating activated carbon with an iodine-potassium iodide mixture. Revoir et al. U.S. Pat. No. 3,662,523 claims improved results with interhalogens such as ICl and $ICl_3$ on filter elements of activated carbon and Anderson U.S. Pat. No. 3,956,458 recommends the use of an elemental sulfur filter followed by an iodine-impregnated filter. Alternately, to purify hydrogen or vent buildings, deJong et al. U.S. Pat. No. 4,196,173 teaches the benefits of injecting elemental chlorine gas ahead of filters of chlorinated active carbon.

Unfortunately, however, impregnated iodine and iodine compounds are released from carbonaceous sorbents at modestly elevated temperatures. Thus, their use is largely limited to ambient-temperature process streams. As explained by Bansal, Donnet, and Wang in their book CARBON BLACK: SCIENCE AND TECHNOLOGY, 2nd Edition, unlike chlorine and bromine, which chemically react with strongly-held carbon surface compounds, iodine compounds are primarily or only physically adsorbed by carbonaceous materials. Consequently, at the elevated temperatures of combustion gas streams, much of any adsorbed iodine or iodides will be released from these materials. Not only could any captured mercury-iodide species evolve off, but the other impregnated iodine species of the materials could volatilize off and corrode downstream structures.

In addition, the above prior art references contact their gas streams with the sorbents in fixed-bed filters. While applicable for small-scale gas processing, it can be cost-prohibitive to run the extremely large volumes of hot flue gas from a power plant through fixed or moving beds of granular carbon. The energy costs of the pressure drop and the fixed costs of the vessel can be unreasonably high, even if the sorbent costs themselves could be kept manageable.

Rather than using iodine or chlorine impregnating gases directly, dissolved metal halides can be advantageously applied to carbon substrates to promote mercury sequestration. Japanese patents 49053590 through 49053594 to Nippon Soda Co. Ltd. and 49066592 to Sumitomo Chemical Co. report on activated carbons impregnated with various halogen metal salts for mercury removal. In addition, Japanese patent 51003386 recommends activated carbon impregnated with a hydrogen halide salt of a compound with one or more functional groups for mercury sequestration. Similarly, in U.S. Pat. No. 4,500,327 Nishino, Aibe, and Noguchi teach that mercury vapors can be advantageously removed from air, natural gas, and incinerator exhausts by activated carbons impregnated with combinations of sulfur, metal sulfates or nitrates, iodine oxides or oxyacids, and the iodides or bromides of K, Na, or $NH_4$. In U.S. Pat. No. 6,533,842 Maes et al., a cupric chloride impregnated carbon in combination with calcium hydroxide is shown to improve mercury reductions from a gas stream. And finally, in publications such as "In-Flight Capture of Elemental Mercury by a Chlorine-Impregnated Activated Carbon," Air & Waste Management Association Paper #731 at the 2001 Annual Meeting, Ghorishi et al., discloses the potential benefits using dilute solutions of hydrogen chloride, HCl, as an impregnate.

Unfortunately, the production of halogenated carbons from dissolved metal halides or hydrogen halide salts is laborious and difficult to perform on a large scale. High-quality base carbons are generally used, the impregnates must be dissolved in a solvent, applied evenly to the fine carbon substrates, the solvents removed, and the carbons wetted, washed, dried, delumped, and sometimes post-processed with heating in inert atmospheres. Working with sorbents made from HCl solutions, for example, Ghorichi et al. found that use of special, deionized water and slow, low-temperature drying were required in order to preserve mercury performance improvements. Consequently, while sorbents made from dissolved halide species may perform well, they end up being very expensive. In the recent Utility HAPs Report to Congress, which included a detailed evaluation of the control technologies available for power plant mercury control, the U.S. EPA reported that:

"Sulfur-, iodide-, chloride salt-, and $Ca(OH)_2$-impregnated activated carbons show promise for increasing the mercury removal efficiency, but further testing is needed. [However, t]he cost of these modified carbons can be as much as 20 times higher than that of unmodified AC." [Page 13–42.]

These high costs, primarily due to their solution-based manufacture, make them uneconomic for duct-injection use at power plants with electrostatic precipitators (ESPs), because large volumes of sorbents are required and they are ultimately thrown away with the fly ash.

In addition to their high costs, carbons impregnated by dissolved halide salts can have the cations of their salts, such as the heavy metals copper, cadmium, strontium, and zinc of prior-art patents, leach into the groundwater when their resulting fly ashes are landfilled.

The particular advantages of using bromine, rather than iodine or iodides, or chlorine or chlorides, with activated carbons for mercury control have not been previously appreciated. Gaseous bromine and hydrogen bromide have been combined with carbon substrates before, but not to sequester mercury from hot combustion-gas streams. For example, Greinke U.S. Pat. No. 5,372,619 found that bromine-treated carbon can make a superior natural-gas storage medium. In another example, SKC Inc. sells a small tube with hydrobromic acid-treated charcoal to sample air for ethylene oxide. However, with both of these uses it is important that the adsorption targets, natural gas and ethylene oxide, be easily desorbable from the carbon, the exact opposite of what is required in a mercury vapor sequestration application. In a similar vein, in U.S. Pat. No. 6,475,461 Ohsaki describes a process for treating carbon substrates with gaseous bromine or chlorine, but then explicitly desorbs them to achieve his desired product. Seki U.S. Pat. No. 3,961,020; Yoshida and Seki et al. U.S. Pat. No. 4,174,373; and Knoblauch et al. U.S. Pat. No. 5,179,058 impregnate activated carbon with bromine to produce a catalyst for reacting nitrogen oxide with ammonia to form nitrogen and water. In this application too, the bromine of the carbon does not act as a sequestration agent, permanently tying up its target. Rather, it serves as a catalyst, taking part in a repeated series of desired chemical reactions, but not becoming permanently consumed by any of them. Perhaps it is understandable that the tenacity of carbon-bromine-mercury complexes could be overlooked.

Recently, a number of inventive methods have been developed to apply mercury sorbent technologies to the large-scale gas streams of coal combustion for power generation. The U.S. patents of Moller et al. U.S. Pat. No. 4,889,698 and Chang, U.S. Pat. No. 5,505,766, for example, describe the injection of fine powdered activated carbon (PAC) into flue gases at points along their journey through various pollution-control equipment trains. A handful of full-scale power-plant sorbent-injection trials have also recently taken place, including one at Great River Energy's Stanton Station capturing an injected, custom-ground, potassium-iodide-impregnated PAC in a fabric filter. While this material removed significantly more mercury than the plain PACs tested at the site, it cost ten times as much. And only about 15% of coal-fired boilers in the U.S. have such fabric filters, which allow for a high degree of mass transfer as the mercury-laden flue gas through a layer of the sorbent on the fabric filter bags. On the other hand, about 65% of U.S. coal-fired utility boilers have ESPs instead of fabric filters, with no flue gas desulfurization systems. This configuration requires in-flight mercury removal, with some amount of time on the ESP plates parallel to the gas flow. Mercury removal at plants with only an ESP is a most difficult mercury-sequestration situation and an application especially targeted by the current invention.

Accordingly, it is an object of the present invention to provide a sorbent material that can be injected into a hot mercury-containing combustion gas, so that a significant portion of the mercury is adsorbed onto the sorbent and removed from the flue gas with the combustion fly ash.

Further, it is an object of the present invention to provide a flexible, retrofitable mercury-control method that can be applied to a number of combustion gas streams and a wide range of exhaust system equipment configurations.

In addition, it is an object of the present invention to provide a mercury sorbent material that is simple and inexpensive to manufacture and use.

It is also an object of the present invention to provide a mercury sorbent material that causes the adsorbed gas-phase mercury to become essentially permanently-sequestered from future interactions with the environment.

SUMMARY OF THE INVENTION

These and other objects of the invention are achieved by a method for removing mercury and mercury-containing compounds from a combustion gas in an exhaust gas system. The method has the steps of providing a mercury sorbent; injecting the mercury sorbent into a stream of the mercury-containing combustion gas for a sufficient time to allow at least an effective amount of the mercury and mercury-containing compounds in the combustion gas to adsorb onto the mercury sorbent and collecting and removing the mercury sorbent from the combustion gas stream. The mercury sorbent is prepared by treating a carbonaceous substrate with an effective amount of a bromine-containing gas for a sufficient time to increase the ability of the carbonaceous substrate to adsorb mercury and mercury-containing compounds.

In some aspects of the invention, the bromine-containing gas comprises at least one of: elemental bromine and hydrogen bromide. In some aspects of the invention, the carbonaceous substrate comprises activated carbon.

In some embodiments, the mercury sorbent is prepared at a temperature greater than 60° C., and in other aspects, the preparation temperature is greater than about 150° C.

The carbonaceous substrate is reduced to a particle size distribution fluidizable in the combustion gas stream prior to the injecting step.

The points of injecting and collecting and removing the mercury sorbent may be varied, depending upon the exact configuration of the exhaust gas system.

In other aspects of the invention, a method for manufacturing a mercury sorbent is provided. The manufacturing method has the steps of: providing a carbonaceous substrate; providing a bromine-containing gas; and contacting the carbonaceous substrate with the bromine-containing gas for a sufficient time to increase the mercury adsorbing ability of the carbonaceous substrate.

In some aspects of this manufacture, the carbonaceous substrate is activated carbon. In some aspects of the manufacture, the bromine-containing gas comprises elemental bromine ($Br_2$) and/or hydrogen bromide (HBr).

BRIEF DESCRIPTION OF THE DRAWINGS

The present invention will be best understood when reference is made to the accompanying drawings, wherein identical objects are identified by identical reference numerals and wherein.

DETAILED DESCRIPTION OF PREFERRED EMBODIMENTS

Figure 1:
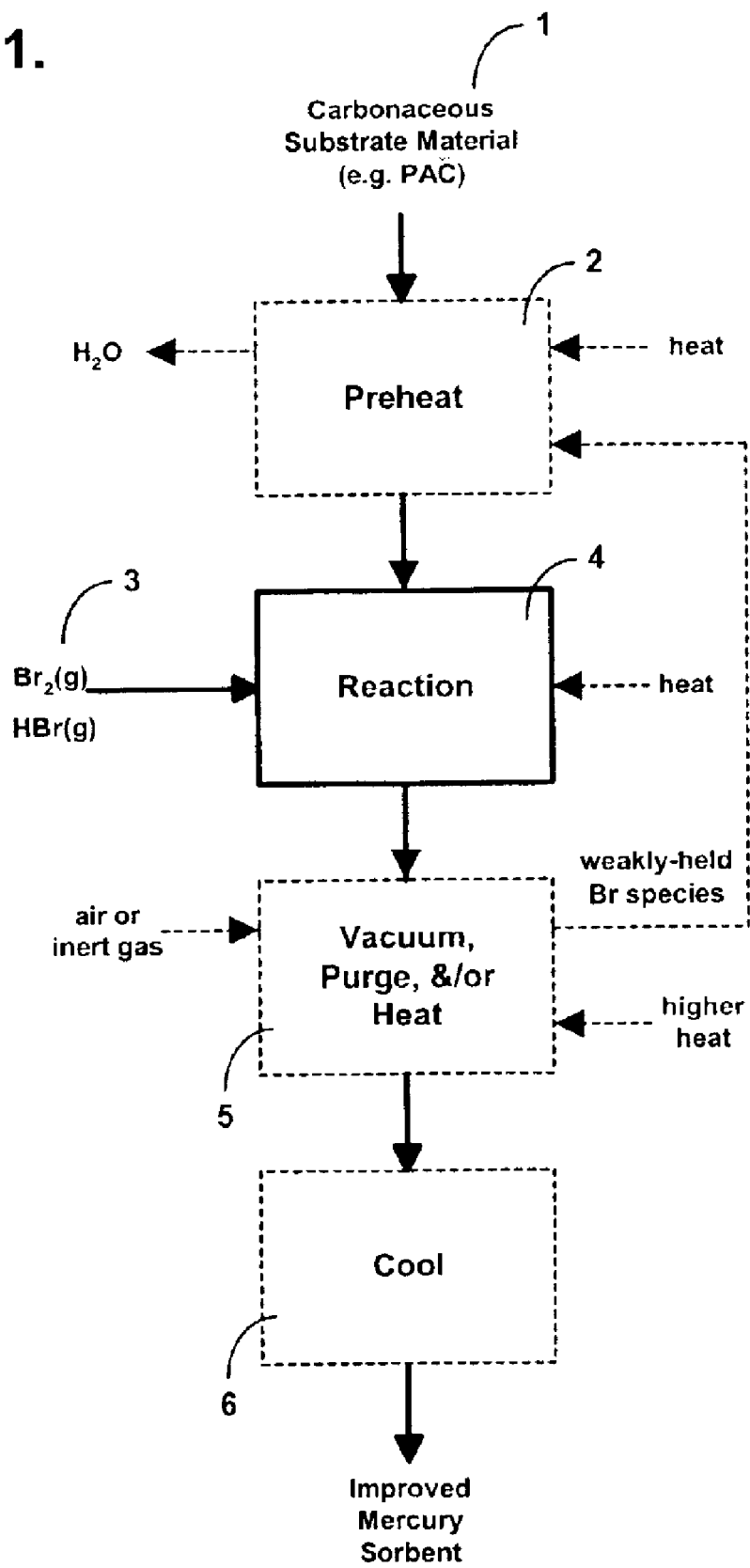
FIG. 1 is a block diagram of the process for manufacturing the improved mercury sorbent compositions.

There are five essential elements to the mercury sequestration claims of the present invention. The first three are that (1) a carbon-based adsorbent, such as powdered activated carbon (PAC), is used (2) to capture and concentrate vaporous mercury species from (3) a hot, flowing gas stream of combustion products. The fourth requirement is that the adsorbent material be (4) injected into the flowing gas, intimately mix with it, and be separated from the gas in a particulate collector. The fifth and final essential element of the invention is that at some time before it is mixed with the mercury-containing combustion gas, the carbon material must (5) be exposed to a bromine-containing treatment gas, possibly producing surface complexes that are particularly reactive to gaseous mercury species.

I have discovered that the simple act of exposing a carbonaceous material, preferably powdered activated carbon (PAC), to gaseous bromine, $Br_2(g)$, or to gaseous hydrogen bromide, HBr(g), significantly increases the carbonaceous material's ability to remove mercury species when injected into high-temperature coal-fired flue-gas compositions. Surprisingly, gaseous bromine produces a much more effective and appropriate carbon sorbent for mercury in hot combustion gases than do iodine or iodide species, or chlorine or chloride species, in contrast to what has been taught in the prior art.

The combination of carbon and gaseous bromine produces an inexpensive sorbent material that can be simply injected into the ductwork of a power plant ahead of an existing electrostatic precipitator, without the need for large volumes of sorbent, retrofitted flue-gas cooling, or extended sorption time on an additional fabric filter.

While not intending to be limited by hypothesized chemistry, it appears that in exposing PAC to concentrated bromine gas, a relatively large quantity of the bromine reacts with the carbon, forming surface compounds on the large surface-area of the carbon. When the PAC is then injected into the flue gas, the elemental mercury and oxidized mercury species there appear to react with at least one form of the bromine-carbon surface compounds that were created and are held fast. When the carbon particles are removed from the flue gas along with the fly ash by the electrostatic precipitator (ESP) or fabric filter, the mercury is removed with them. The mercury sorbents are then disposed of with the fly ash. Because the mercury has been chemically adsorbed, rather than just physically adsorbed, the captured mercury appears to be very stable and does not revolatilize or leach.

Production of the new mercury sorbent materials is simple and inexpensive. The carbon material and the bromine gas need simply be contacted with each other for the advantageous mercury-reactive surface compounds to quickly form. Elemental bromine is a liquid at ambient temperature, but turns to a gas at only a modestly elevated temperature. Hydrogen bromide is a gas at even ambient temperature. Using a gas-phase carbon reactant considerably simplifies the production of the sorbent and leads to the low costs which are a requirement for a sorbent to be used as a once-through duct injectant. Any common mixing method and equipment can be used to contact the gaseous bromine species with the carbon-based substrates, although it is preferably lined with corrosion-resistant material, because the bromine species can be quite corrosive. It is also preferable that the mixing of bromine gas and carbon be done at an elevated temperature. This keeps the bromine gas in the gaseous form, but also minimizes the amount of any bromine physically-adsorbed into the pores of the carbon. Such physically adsorbed bromine is not chemically bound to the carbon lattice and can be emitted in handling, in storage, and especially, when the sorbent is injected into a hot flue gas.

Reference will now be made in detail to the preferred embodiments of the invention which are illustrated in the accompanying figures.

FIG. 1 is a block diagram describing the process for manufacturing the mercury sorbent of the invention. Elements with dotted lines are preferred embodiments, rather than required steps of the invention. The process begins with a carbonaceous substrate material 1 for the mercury sorbent. Many different materials can perform this role in the invention. By way of example, but not intending to be limiting, possible carbonaceous materials comprise: activated carbon, activated charcoal, activated coke, char, and unburned or partially-burned carbon from a combustion process. The carbonaceous substrate could even be another specialty mercury sorbent, a sulfur-impregnated PAC, for example. The important features of the sorbent substrate material are that it is significantly composed of carbon and that it has an adequate degree of porosity or surface area to enable it to provide mercury removal in the process. The size of the carbonaceous particles during bromination is not critical as long as their mass is uniformly exposed to and reacted with the bromine. The material can be fine enough already so that it can be mixed with and carried by the mercury-containing flue-gas stream, or it can be large and granular, to be comminuted after bromination, but prior to being injected into the mercury-containing gas stream.

A preferred carbonaceous substrate material is activated carbon. If the manufacturing process of this invention is integrated into the manufacture of the activated carbon material itself, the carbonaceous substrate could be, for example, the carbon material after it has undergone a steam activation procedure. Alternately, the activated carbon entering the treatment process at 1 can be an existing commercial product. Preferably the activated carbon is in a very fine state, which allows for a more uniform bromination later in the process. An example would be a powdered activated carbon (PAC). Such a material would already have some gas-phase mercury adsorption capability which the treatment process of this invention will greatly amplify.

If the carbonaceous substrate material 1 begins at ambient temperature, preferably it is preheated 2, to a temperature of above about 100° C. One purpose of such preheating is to drive off any physically-adsorbed moisture from the carbonaceous substrate which blocks the material's pores and will interfere with the bromination step. A separate vessel may optionally be utilized for this preheating step or it can be integrated into the larger processing scheme.

A critical element in the process is that a bromine-containing gas 3 is used to treat the carbonaceous substrate. Preferably this gas comprises elemental bromine, $Br_2(g)$, although other bromine-containing gases, such as hydrogen bromide, HBr, will also have the advantageous effect of the invention.

In the liquid form at ambient temperatures, elemental bromine is dense and compact, with advantages in transport and storage. To be utilized in this invention, however, it must first be heated to at least about 60° C. and turned into a gaseous state. In such a state it can more uniformly treat the carbonaceous materials at low levels and provide the desired effect of increasing their mercury sequestration capabilities. A preferred method of converting the liquid bromine to a bromine-containing gas is to use a heated lance. Liquid bromine can be metered into such a heated-lance system at one end and be distributed as a gas to the substrate materials at the other end.

In some applications it may be beneficial to utilize a diluting carrier gas to better distribute the $Br_2(g)$ or HBr(g) among the carbonaceous substrate particles. However, if the process of this invention is practiced in a batch mode, it can be preferable to use pure $Br_2(g)$ or HBr(g). These can be injected into a sealed processing vessel with only a modest, temporary rise in vessel pressure, with the pressure subsiding as the bromine gas species become incorporated into the carbonaceous substrates. It is not a preferred embodiment of this invention to include water with the bromine gas vapor if this causes corrosion problems in the processing equipment that outweigh any advantages.

The key step in the sorbent manufacturing process is exposing the dried carbonaceous materials to the bromine-containing gas, 4. When the gas contacts the solids, it is quickly adsorbed and reacted with materials. Preferably this is done at an elevated temperature, with the carbonaceous materials at least as hot as the bromine-containing gas. More preferably this is done with the carbonaceous materials at a temperature at or above about 150° C., or above the temperature of the mercury-containing flue-gas stream into which the sorbents will be injected. The contacting of the bromine-containing gas and carbonaceous solids can be done at any advantageous pressure, including atmospheric pressure.

The carbonaceous materials will both physically adsorb the bromine species at 4 and chemically react with them. It is preferable to minimize the amount of bromine that is physically-adsorbed weakly on the carbons. Physically-adsorbed bromine is prone to desorb from the materials upon changed conditions, such as injection into a hotter gas stream, for example. It is desirable to have the bromine as stable as possible on the carbon, yet in a form that is still reactive towards mercury. By exposing the carbon to the bromine at an elevated temperature, less of the bromine species will volatilize off from the sorbents during their transport and storage or upon their injection into the hot combustion stream.

Any level of bromination of carbonaceous substrates appears to increase their mercury-removal performance. While over 30 wt % of $Br_2(g)$ can be adsorbed into some powdered activated carbons, for example, significant increases in mercury reactivity will be observed with only about 1 wt % $Br_2(g)$ in the PAC. Greater degrees of bromination do correlate with greater maximum mercury capacities for a particular carbonaceous substrate. However, with the sorbent-injection application of this invention, only a fraction of a material's maximum possible mercury capacity is typically utilized, so the optimum level of bromine to combine with the carbon substrate may vary with the particular situation. If a PAC substrate is used, brominating to 1 wt % provides a highly-capable mercury sorbent, although a 5 wt % material performs better and may be preferable. Brominating to 15 wt % $Br_2$ generally produces an even more capable mercury sorbent, but as some of the bromine is held at less-energetic sites, there is a greater possibility that some degree of bromine may evolve off under some circumstances. Mercury sorbents with higher bromine concentrations will take longer to produce and cost more as well.

Note that the bromination step 4 can occur in any number of possible reactors. The particular equipment used to contact the carbonaceous substrates with the bromine-containing gas can be, for example, a stationary mixer, a rotating drum, a structure with a vertically-moving bed, a fluidized-bed unit, a transport reactor, or any other contactor known in the art. The manufacturing process is not limited by the type of process equipment used. Any equipment or method that quickly and evenly distributes the bromine-containing gas to intimately contact the carbonaceous particles will satisfy the requirements of the invention.

Preferably an additional step 5 is utilized in the process to strip off any weakly-held bromine species from the sorbents after the bromination step, making the sorbents safer to use. This can be accomplished by numerous methods, including by vacuuming out the vessel holding the materials, by purging the vessel with air or an inert gas, by heating the sorbents to a temperature above that of their bromination, or by a combination of these methods. In one embodiment of the process any bromine species that are desorbed can be transported to unsaturated substrate materials upstream in the process, eliminating the need to dispose of the off-gas stream.

Finally, in many instances it will be useful to cool the brominated mercury sorbents, 6. At this point the improved mercury sorbents can be packaged or stored or used directly at the site of the mercury-containing gas.

FIGS. 2 through 6 are schematic diagrams of exhaust gas systems describing example methods for using the sorbents of the invention to remove and sequester mercury from hot combustion gases.

Figure 2:
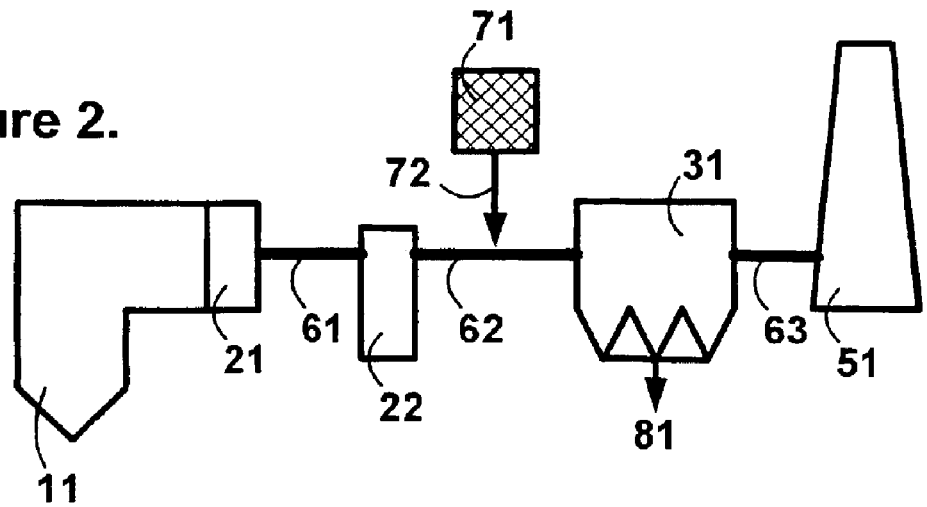
FIGS. 2 through 6 are schematic diagrams of exhaust gas systems describing example methods for using the improved sorbent compositions to remove and isolate mercury species from hot combustion flue gases.

FIG. 2 applies the sorbents to a combustion gas stream where a fabric filter (baghouse) is utilized to collect the fly ash generated during combustion. Coal or wastes or other fuels are combusted in a boiler 11 generating mercury-containing flue gas which is cooled by steam tubes and an economizer 21. The gas typically flows through ductwork 61 to an air preheater 22, which drops the gas temperature from about 300-to-400° C. down to about 150-to-200° C. in the ductwork 62 exiting the air preheater.

In such an arrangement, the mercury sorbent of this invention, stored in a container such as a bin 71, is fed to and through an injection line 72 to the ductwork 62 and injected through a multitude of lances to be widely dispersed in the hot combustion flue gas. Mixing with the flue gas, the sorbent adsorbs its elemental mercury and oxidized mercury species. The sorbent flows with flue gas to a fabric filter 31 and is deposited on the filter bags in a filter cake along with the fly ash and other gas-stream particulates. In the fabric filter the flue gas is forced through the filter cake and through the bag fabric. This causes intimate contact between the sorbents and the remaining mercury in the flue gas and will result in a high degree of mercury capture with a high degree of utilization of the sorbents. Cleansed of its mercury content and particulates, the flue gas exits the fabric filter to ductwork 63, the smokestack 51, and then to the atmosphere. Upon cleaning of the fabric filter bags, the mercury sorbents in the filter cake fall into hoppers and are eventually emptied 81 from the fabric filter 31 and are disposed of along with the collected fly ash and unburned carbon. The mercury sorbents of this invention will generally make up on the order of 1 wt % of the collected particulates in pulverized coal power-plant applications.

Figure 3:
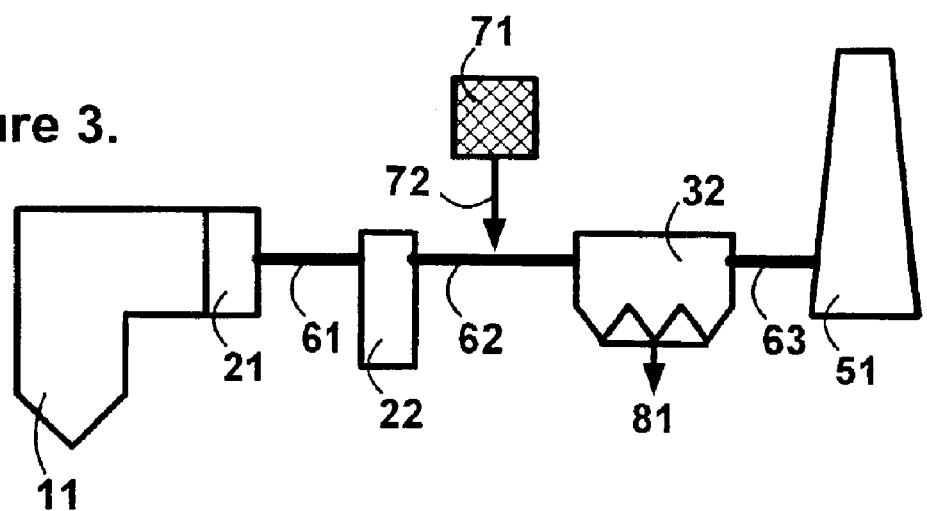

FIG. 3 describes the possible application of the sorbents to a plant which has "cold-side" electrostatic precipitator (ESP) 32 instead of a fabric filter. This is a more difficult situation for mercury removal than with a fabric filter because the flue gas is not forced through the sorbent in a filter cake layer of a collection bag. The hot mercury-containing combustion gas is generated in the boiler 11 as in FIG. 6 and flows through the same equipment to the ductwork 62. The mercury sorbent of bin 71 is similarly injected 72 into the ductwork to mix with the flue gas. Because of poorer mass transfer within the ESP 32, however, it is particularly important to inject at 72 as far ahead of any turning vanes, flow distributors, ductwork, and other exposed surface-area in the ductwork as possible. This not only provides more residence time for the sorbents to mix with and remove mercury from the flowing gas, but provides more mass transfer area for the sorbent to collect on, further increasing the overall mass transfer and mercury removal. In the ESP 32, the sorbents are collected on plates with the fly ash and upon rapping of the plates are eventually discharged 81 from the ESP 32 for disposal along with the rest of the particulates.

Figure 4:
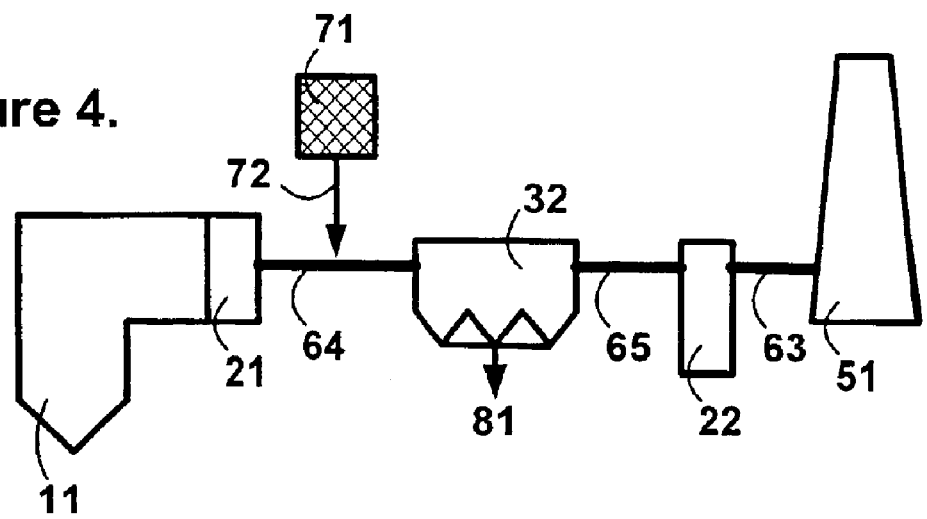

FIG. 4 describes the possible application of the sorbents to a plant which has a "hot-side" ESP, a particularly difficult situation for mercury control. In this equipment arrangement, the air preheater 22 follows the ESP 32, so the temperature of the mercury-containing flue gas in the ductwork 64 before the particulate collection is very high, in the range of 300-to-400° C. Plain powdered activated carbons do not capture any mercury at these temperatures and PACs impregnated with iodine or sulfur lose their impregnates. Surprisingly, the mercury sorbents prepared according to the process of this invention appear to capture mercury in at least the lower end of this temperature range. Consequently, the sorbents from bin 71 can be useful even when injected at 72 into the very hot, low-oxygen, mercury-containing gases in ductwork 64. The sorbents would be collected with the other gas stream particulates in the hot-side ESP 32 and the cleaned gas would proceed through ductwork 65 to the smokestack.

The method for removing mercury from combustion gas streams of this invention is not limited to the particular arrangements described in the figures. These have been provided simply to illustrate common examples and many other variations are possible. For example, a wet scrubber for flue gas desulfurization could appear at 63 in FIGS. 2 through 4 or a particulate scrubber could replace ESP 32. Selective catalytic reduction (SCR) units for NOx reductions, or flue gas conditioning systems to improve particulate removal, could also be placed in the equipment arrangements. The utility of the disclosed mercury-removal method would be unaffected, however.

Similarly, the mercury sorbents could be injected while mixed in with sorbents for other flue gas components, such as calcium or magnesium hydroxide or oxide for flue gas $SO_3$, HCl, or $SO_2$, rather than injected alone. Alternately, the mercury sorbents could be injected in a liquid slurry, which would quickly evaporate in the hot flue gas. Other variations of the methods of applying this invention can be formulated by those familiar with the art and they should be considered within the scope of this disclosure and the included claims.

Figure 5:
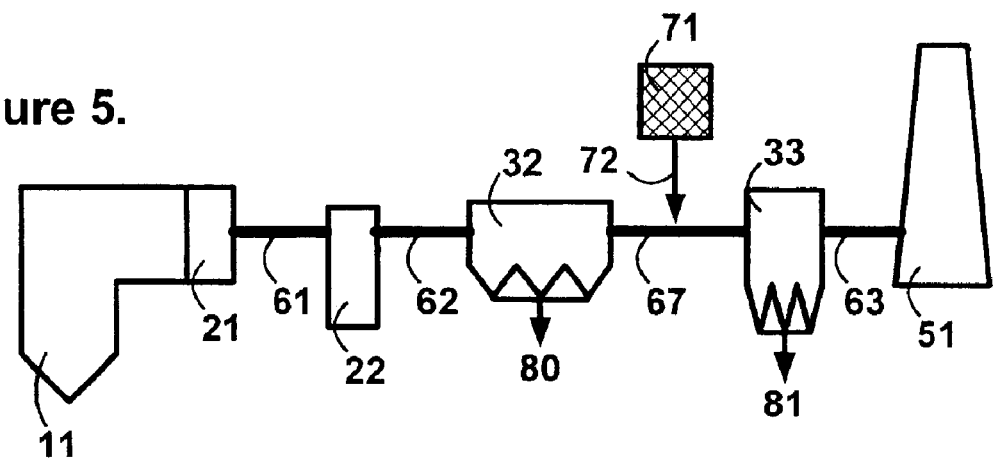

Two such arrangements bear particular mention. FIG. 5 applies the sorbents in a "TOXECON®" arrangement. Here the mercury sorbents 71 are injected after an ESP 32 into the almost particulate-free ductwork 67 before a small, high-velocity fabric filter 33. In this manner the fly ash 80 does not become mixed with the carbonaceous sorbents, allowing the fly ash to be sold for concrete use. Moreover, the filter cake of fabric filter 33 would predominantly be mercury sorbent, allowing a longer residence time, higher utilization levels, and the possibility of recovering and reinjecting the sorbent to lower costs. The superior reactivity and capacities of the mercury sorbents of this invention make them prime candidates for use in such an arrangement.

Figure 6:
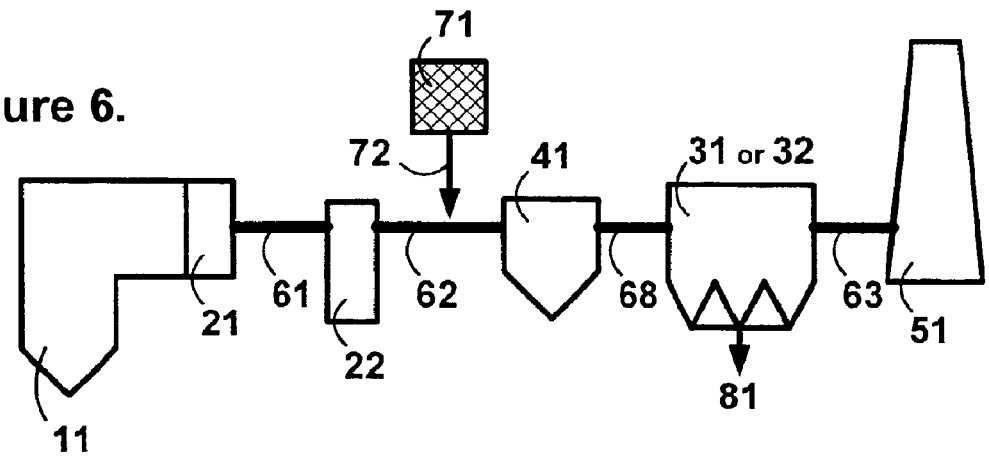

FIG. 6 illustrates sorbent usage at plants that have spray dryers for acid rain control. The mercury sorbent could be injected 62 before the spray dryer 41, into the spray dryer 41, into the ductwork 68, between the spray dryer and the particulate collector 31 or 32, or mixed in with the scrubber slurry itself.

Other possible alternatives within the scope of the invention would be to brominate unburned carbon collected from a particulate collector and then to inject it into the gas stream or to brominate carbonaceous "thief" particles withdrawn from the combustor 11 before their complete combustion and to inject them at lower temperatures downstream.

Now the present invention will be further described in detail by way of examples.

EXAMPLE 1

The gas-phase bromine treatment of this invention has been tested on many different commercially-available powdered activated carbons (PACs). Each has been found to be easily brominated to at least 15 wt % Br, including PACs from Barnebey Sutcliffe, Calgon (WPL, Fluepac A, and Centaur®), General Carbon, Nichem, Action Carbon, Advance Recovery Technologies, and Norit. Norit's Darco FGD® is a common PAC frequently used by other researchers as a comparative yardstick.

Figure 7:
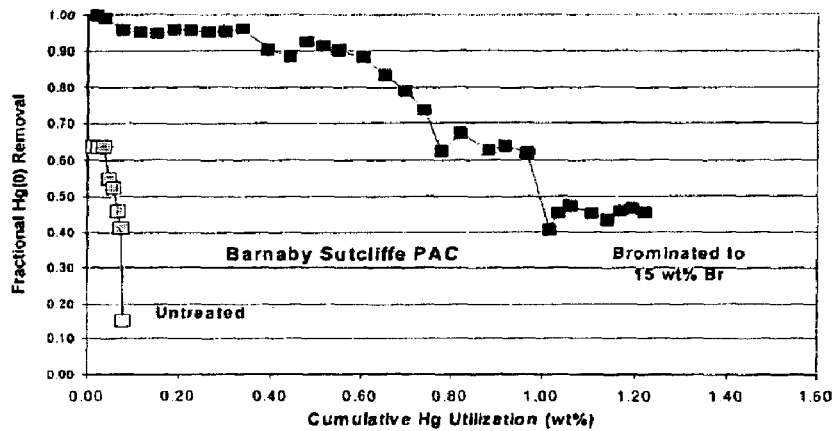
FIGS. 7 through 9 are performance plots indicating improvements in mercury capture with the invention.
Figure 8:
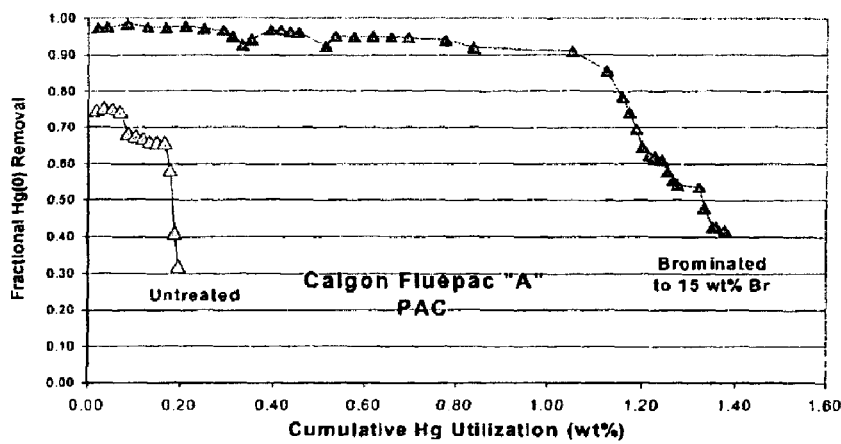
Figure 9:
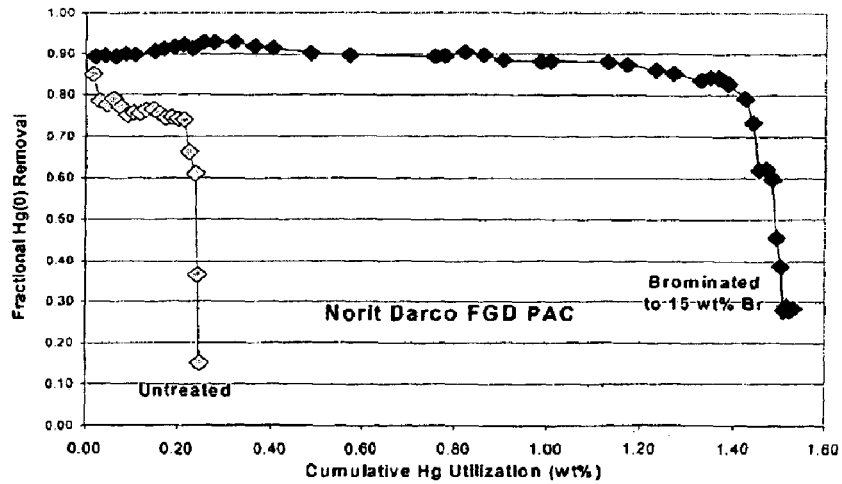

The bromine-gas treatment of this invention was found to markedly increase the mercury removal-capacity of every PAC tested. FIGS. 7, 8, and 9, exhibit the fixed-bed mercury breakthrough-curves of three commercial PACs, comparing the elemental mercury capacities of both the untreated and bromine-treated materials. Laboratory fixed-bed capacity tests roughly simulate the conditions of a sorbent in a filter cake on a bag in a fabric filter. While they do not simulate the kinetics and mass transfer of duct-injection into an ESP, they do provide measures of the maximum mercury capacity of the material and the slope of the breakthrough curve provides some idea of the kinetics.

The standard laboratory fixed-bed testing procedure that was used is similar to that of other researchers and generates a traditional breakthrough curve. In the standard procedure used in these experiments, thin fixed-beds of PAC of about 50-mg were vacuum-applied to filters and placed in a filter-holder in a laboratory oven at 175° C. (350° F.), the temperature commonly available before particulate collection devices at combustor facilities. The treated samples had been earlier exposed to gaseous bromine at 175° C. in a closed container until no gaseous bromine was detected.

In the examples of FIGS. 7, 8, and 9, a challenge gas was sent through heated lines to each of the materials at 6.7 lpm that contained an average of about 400 $\mu g/Nm^3$ of elemental Hg from permeation tubes in an oil bath. To simulate a combustion gas stream, 1400 ppm $SO_2$ and 600 ppm NOx from bottled gases and 4 wt % of water from a peristaltic pump were also spiked into the gas with the balance being 11.5% $O_2$ and the rest, $N_2$. Mercury levels both into and out from the materials were measured with a gas-phase elemental mercury analyzer. A detailed description of the test unit can be found in a paper by the inventor, along with Qunhui Zhou, and Jon Miller, "Novel Duct-Injection Mercury Sorbents," presented at the Air Quality III Conference in Arlington, Va. in September, 2002.

As described in FIGS. 7, 8, and 9, the bromine treatments of this invention increased the elemental mercury capacity of these PACs by from 500% to 1000%.

Plotting the curves as a function of cumulative Hg utilization in terms of wt % of the sorbent, rather than as a function of time, normalizes the curves for comparison under different conditions. Note that the inverse of the utilization at breakthrough corresponds to the minimally-required sorbent injection rate expressed as a sorbent weight-ratio to mercury in the flue gas at the conditions tested. The high absolute mercury utilizations of these materials are partially due to the high mercury concentration used in this example, which is typical of the combustion gas from a waste incinerator. However, the relative increases in mercury capture with bromination are proportional to those found at the lower concentrations more typically found at coal-fired power plants as well.

COMPARATIVE EXAMPLE 1

Figure 10:
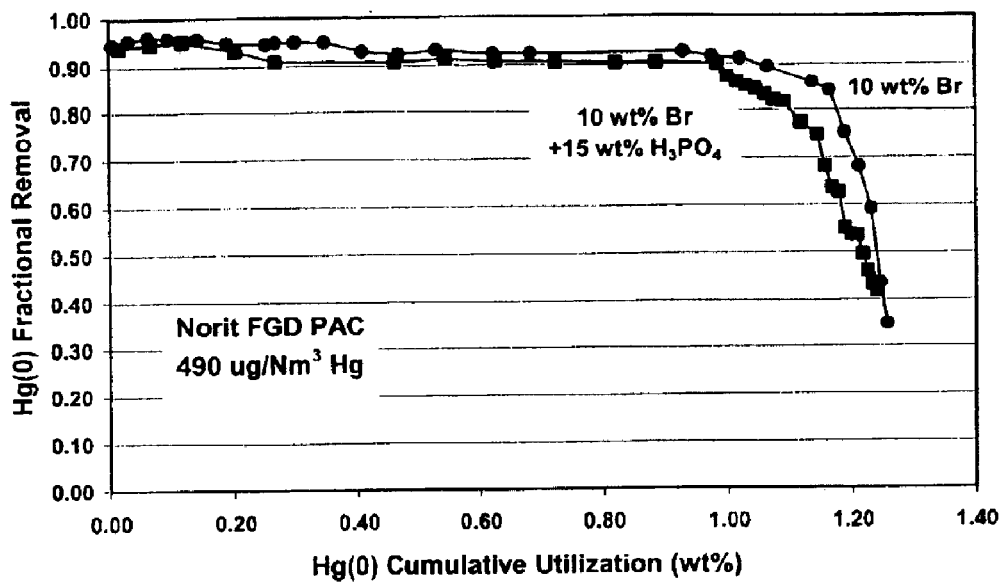
FIG. 10 is a plot of the mercury performance of a sorbent of this invention indicating no synergistic advantage with the addition of a non-volatile acid, $H_3PO_4$, to the carbon.

In this example, a Norit Darco FGD PAC was brominated according to the invention to 10 wt % with $Br_2(g)$. Part of this sample was then additionally impregnated to 15 wt % with a non-volatile acid, $H_3PO_4$, as taught by Aibe et al., U.S. Pat. No. 4,427,630. When both samples were tested according to the procedures in Example 1, the nearly identical breakthrough curves of FIG. 10 were obtained. The additional acid-treatment step provided no benefit for the capture of mercury.

EXAMPLE 2

Figure 11:
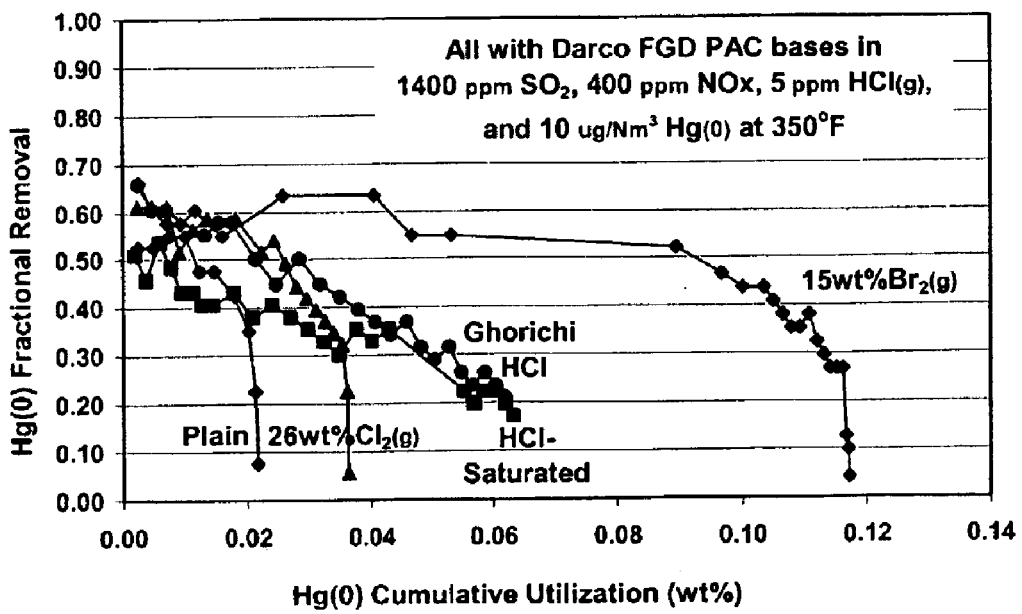
FIG. 11 is a plot of the comparative elemental mercury performance of a sorbent of this invention with those of other halogen treatments.

A series of fixed-bed mercury-capacity evaluations were performed examining the relative performance of a typical powdered activated carbon, Norit Darco FGD®, adsorbed or reacted with different halogen species. The procedures of Example 1 were repeated, except that smaller samples were used and a mercury challenge-gas concentration was about 13 $\mu g/Nm^3$, typical for flue gases of coal-fired power plants. The resulting breakthrough curves are plotted in FIG. 11.

The sample that had been exposed to gaseous chlorine, $Cl_2(g)$, exhibited some improvement in mercury removal performance relative to the plain, untreated PAC. Two samples of HCl-treated PACs showed even higher ultimate mercury capacities, but poorer kinetics. One of these samples had been pretreated by flowing gas-phase HCl through the PAC sample until it no longer added mass. The other, acquired from Ghorishi et al., was produced by a dilute liquid-phase HCl treatment described in their publications. The elemental mercury breakthrough curves of the two HCl-treated PACs were very similar, exhibiting a slow and steady drop-off in performance, indicative of poor mercury adsorption kinetics. In contrast, the brominated sample of this invention broke through very sharply and captured more than five times the elemental mercury of the untreated PAC.

EXAMPLE 3

Examples of sorbents of this invention have also been evaluated in other laboratory-scale fixed-bed test systems by others for elemental and oxidized ($HgCl_2$) mercury capacity. Test systems for each species, very similar to the one used in Examples 1, 2, and 3, have been described in detail in Carey et al., "Factors Affecting Mercury Control in Utility Flue Gas Using Activated Carbon", J. Air & Waste Mange. Assoc., 48, 1166–1174, 1998. Major differences between the systems, however, concern the loading of the test sorbent and the mercury concentration of the challenge gas. Rather than vacuum-load the test sorbents onto a two-dimensional filter, as in Examples 1 and 2, in the tests of this example the sorbents were mixed 1:10 with inert sand and loaded as a three-dimensional bed. Second, the tests in Example 3 were performed with a mercury concentration of 10 to 15 $\mu g/Nm^3$, duplicating common power plant parameters, whereas the tests of this example were at concentrations of about 75 $\mu g/Nm^3$ for Hg(0) and about 30 $\mu g/Nm^3$ for $HgCl_2$. The results were then "normalized" to 50 $\mu g/Nm^3$. Because of these differences, quantitative results on the two systems can be expected to be different; however, the qualitative results should correspond.

A number of the brominated sorbent samples were tested under the standard conditions of these units, with the elemental mercury test gas containing 400 ppm $SO_2$, 200 ppm NOx, 2 ppm HCl, and 7% $H_2O$, and the oxidized mercury test gas containing 400 ppm $SO_2$, 400 ppm NOx, 50 ppm HCl, and 7% $H_2O$. The sorbents were loaded at 2 mg/g of sand and the tests were run at 135° C., favoring the untreated PAC, which does not work well at more-elevated temperatures.

Figure 12:
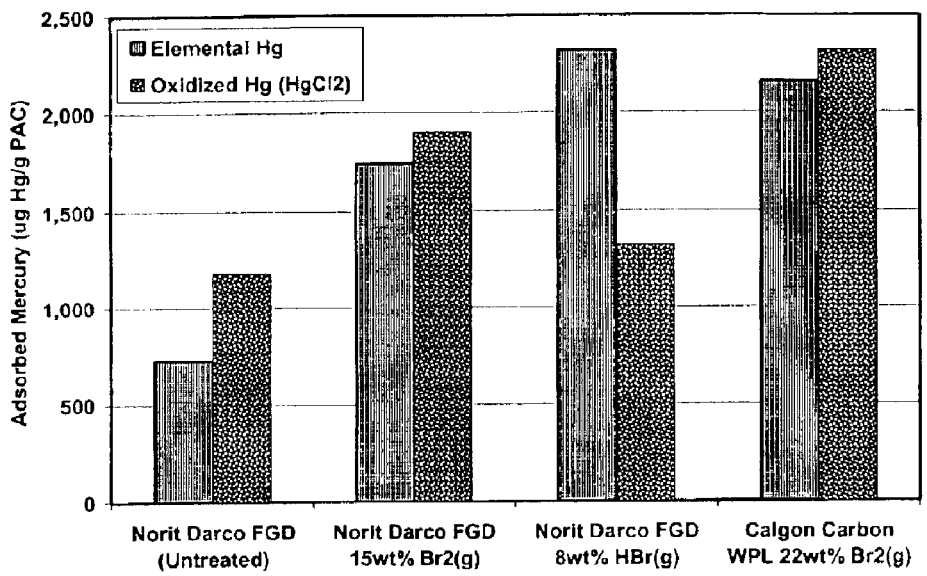
FIG. 12 presents the comparative capacity increases for both oxidized mercury ($HgCl_2$) and elemental mercury of three sorbents processed according to this invention relative to sorbent not so processed.

The results appear in FIG. 12. The data for plain Norit Darco FGD® PAC, used as a reference standard, are averages from ten tests. The values for capacity at initial breakthrough represent the cumulative mercury adsorption of the sample at the point bed breakthrough begins. As before, the brominated carbons adsorbed considerably more mercury species than the untreated versions, with the improvements averaging about 100%. Importantly, the bromine-gas-treated sorbents removed about as much oxidized mercury-chloride from the test gases as elemental mercury, indicating performance improvements with both kinds of common flue-gas mercury species.

EXAMPLE 4

Figure 13:
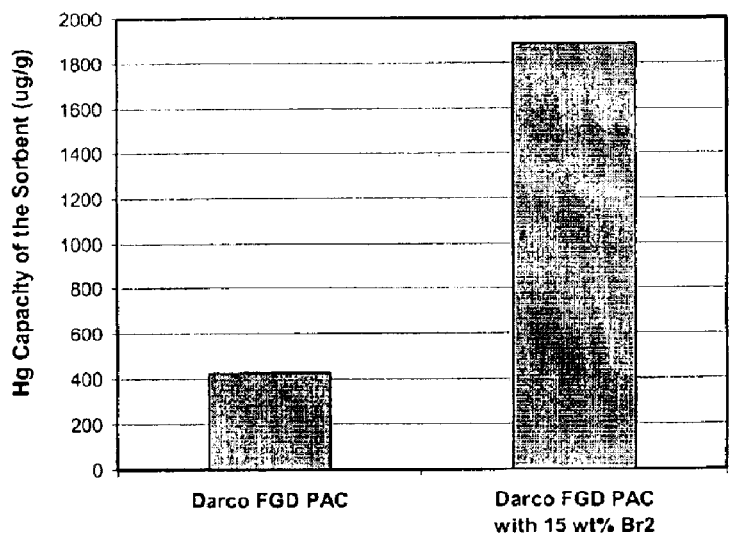
FIG. 13 presents the additional mercury capacity achieved by a sorbent manufactured according to this invention on an actual coal-combustion flue gas relative to that of a sorbent not so processed.

To determine if the mercury sequestration results on actual, coal-fired flue gas would parallel those achieved with the simulated flue gases, a sample of the 15 wt % brominated sorbent of this invention was included in fixed-bed capacity-tests performed on a small slipstream of flue gas at We Energies' Pleasant Prairie power plant in Wisconsin in the U.S. The Pleasant Prairie plant burns a low-sulfur subbituminous coal and has high mercury of about 14 $\mu g/Nm^3$, nearly all in the elemental form. The brominated sorbent was tested at 150° C. with $SO_3$ in the gas stream from a flue gas conditioning system. See the results in FIG. 13. Of the sorbents tested under these conditions, the brominated sorbent performed the best, removing over 300% more mercury than the untreated PAC, for example.

EXAMPLE 5

In the next example, a large series of actual duct-injection runs were performed with a simulated coal-fired flue-gas stream on a 50-acfm pilot-scale test system. The mercury mass transfer to fluidized sorbent and adsorption kinetics in this system are similar to that in a full-scale utility application. The fully-instrumented duct-injection test system that was used included a propane burner unit to generate the hot flue gas; a humidification drum to add an appropriate degree of moisture to the gas; an elemental mercury spiking subsystem with elemental mercury permeation tubes; a flue gas spiking subsystem with mass flow controllers for $SO_2$, NOx, and HCl; a small sorbent feeder and fluidizing injection subsystem to lessen sorbent pulsing; 10 meters of insulated, 10-cm-diameter ducting circling the ceiling; thermocouples; an electrostatic filter with an effective specific collection area (SCA) of about 500 $ft^2$/Kacf; a back-up fabric filter; a safety filter; an orifice plate to measure flow; and a variable-speed I.D. fan. The gas temperature at injection was about 175° C. and at the ESP was about 145° C. and the spiked flue gas concentrations were about 24 $\mu g/Nm^3$ Hg(0), 1400 ppm $SO_2$, 600 ppm NOx, and 5 ppm HCl, typical values for coal-fired power plants.

Both an untreated PAC, Norit Darco FGD, and brominated samples were injected at various rates into the hot gas with a ductwork residence time of about 3.5 seconds before the miniature ESP. The brominated PACs were treated to different levels with gaseous $Br_2(g)$ or HBr. Mercury measurements before and during injection were taken using a $SnCl_2$ oxidized-mercury conversion system and a dual-beam cold vapor atomic adsorption analyzer outfitted for continuous, gas-phase use.

Figure 14:
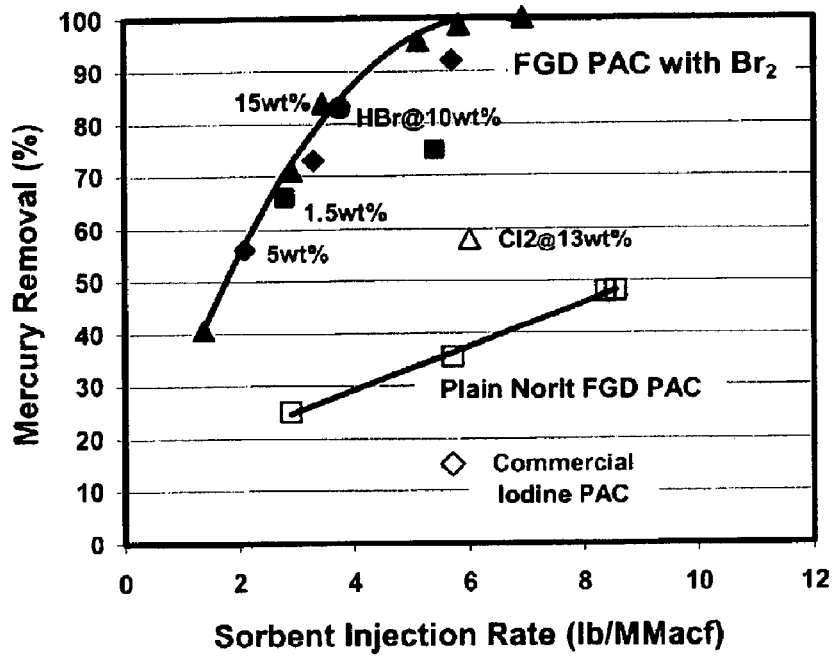
FIG. 14 indicates the mercury capture in a simulated coal-fired duct-injection ESP application of sorbents processed according to this invention relative to those not so processed.

The results of the various duct-injection runs appear in FIG. 14. At every bromine level and injection level tested, the brominated samples removed more mercury from the gas than did the untreated samples. There was not much difference in the performance between the various brominated samples, probably because in the duct-injection mode they only used a small fraction of their available mercury adsorption capacity. In general, however, the brominated samples performed about 400% as well at sequestering mercury as the untreated samples. To achieve 50% mercury removal, for example, required over 8 lb of untreated PAC per million actual cubic feet of gas flow, but less than 2 lb were required with brominated PAC. The brominated PAC achieved 90% mercury removal with only 4 lb of sorbent injected/MMacf.

FGD PACs impregnated with other halogens were also tested under the same conditions in the pilot unit. Results were not nearly as good as for the gas-brominated sorbents of this invention. See FIG. 14. About three times as much chlorine-gas treated PAC was required to achieve the same degree of mercury removal as with bromine. The results for a commercially-available iodine-impregnated carbon, CB, from Barnebey Sutcliffe, which is produced from a potassium iodide solution and uses an expensive coconut-shell carbon substrate, were somewhat ambiguous. After being ground to a size similar to that of the FGD PAC, it was injected into the gas stream, flowing in the ductwork like the other samples. However, it appeared that a major portion of the iodine volatilized off from the materials at the flue-gas temperatures and, rather than sequestering the elemental mercury, simply converted a majority of it to an oxidized form.

EXAMPLE 6

For duct-injection testing at larger-scales, a series of 20-kg batches of the sorbents were prepared according to the methods of this specification and FIG. 1, brominating at about 150° C. In this example, however, the vacuum, -purge, -or -heat step after bromination was not used, allowing a possible degree of loosely-held physically-adsorbed bromine gas to remain on the sorbents. A similar chlorine-gas-treated material was also produced. The halogens were delivered to the heated PAC substrates through a heated lance, entering the sealed vessel as gases, and the vessel was rotated.

Manufacture of the elemental bromine sorbents was much faster than for the others. The elemental bromine was adsorbed and reacted with the PACs much faster than was the elemental chlorine, for example—one-hundred-times faster. This allowed for quick and inexpensive manufacture of these sorbents. See the table below with rate data in terms of grams of gas adsorbed per kilogram of PAC per minute. The PAC adsorption of gaseous hydrogen bromide, HBr(g), was ten times faster than it was for chlorine.

| Gaseous Halogen | Final Loading on FGD PAC (wt %) | Adsorption Rate (gm of gas) / (kg PAC × min) | Concentration in Storage Vessel (ppm) |
|---|---|---|---|
| $Br_2$ (g) | 5% | 10 | 0 |
| $Br_2$ (g) | 15% | 10 | 0.5 |
| HBr (g) | 9% | 1 | N.A. |
| $Cl_2$ (g) | 13% | 0.1 | >40 |

To check the stability of the treated sorbents, they were placed in sealed containers and left for a few days. Upon opening the containers, measurements were made in the headspaces for volatilized species. See the results above. No released bromine was detected in the 5 wt % $Br_2$ sorbent, but very high off-gassed chlorine was detected in the chlorine container.

EXAMPLE 7

A large-scale duct-injection trial of the technology was performed at the 18-MW scale, with about 60,000 acfm of flue gas at 160° C. The plant had stoker-fed boilers, burned a high-sulfur bituminous coal, and had just a cold-side ESP for emission control. Baseline sampling according to the Ontario Hydro Method indicated no intrinsic mercury removal of mercury across the ESP.

Without sorbent injection, the plant emitted about 10 $\mu g/Nm^3$ of mercury from the stack, with 80 to 90% of this in oxidized forms. In these trials, the mercury was measured using a speciating PS Analytical Sir Galahad continuous mercury monitor. Inlet mercury values were obtained by sampling upstream of the sorbent injection point and outlet mercury was measured at the stack. The sorbents were injected into ductwork through a lance to mix with the flue gases about 40 feet from the entrance to the ESP. The flue gas contained about 1000 ppm of $SO_2$, 250 ppm of NOx, and 25 ppm of HCl. The ESP had an SCA of 370 $ft^2$/Kacfm.

Figure 15:
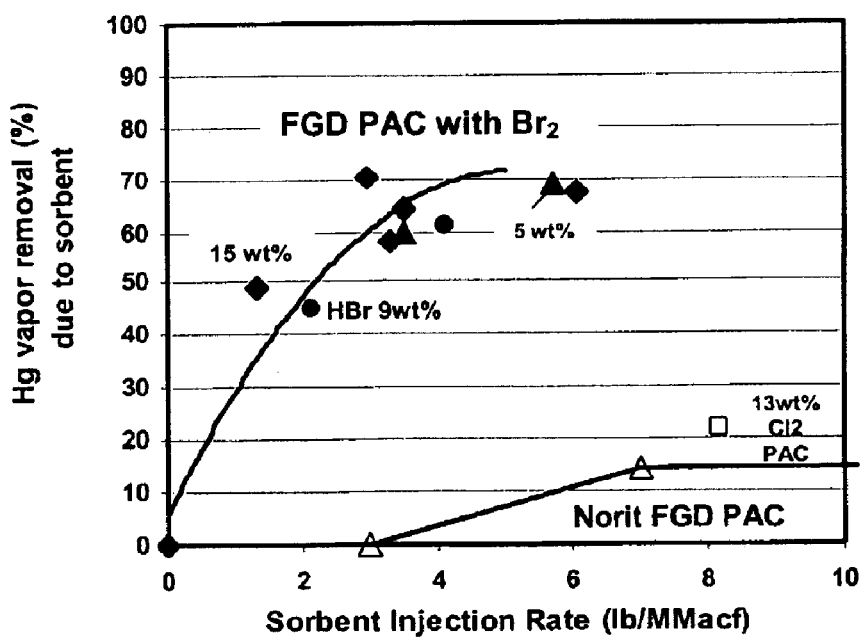
FIG. 15 indicates the mercury capture capabilities in an actual coal-fired duct-injection ESP application of sorbents processed according to this invention relative to those not so processed.

A number of different sorbents were evaluated in the trials at different injection levels. Results are presented in FIG. 15. The untreated Norit Darco FGD® PAC used as a baseline did not remove much mercury at this plant. At an injection rate of almost 18 lb/MMacf, it captured less than 20% of the flue-gas mercury. The plant's unusually high $SO_3$ of about 20 ppm, which competes for active adsorption sites on the PAC, may be responsible for this poor performance. Treating the PAC with chlorine gas, $Cl_2(g)$, to 13 wt % produced only slightly better performance.

The brominated sorbents of this invention, on the other hand, performed very well with this difficult flue gas, achieving about 50% mercury removal with only 2 lb/MMacf of sorbent consumption and almost 70% removal at an injection rate of 4 lb/MMacf. PACs brominated with $Br_2$ to 5 wt % and 15 wt %, and with HBr to 9 wt % all performed similarly.

EXAMPLE 8

The sorbents of this invention do not appear to easily give up their captured mercury. Toxic Characteristic Leaching Procedure (TCLP) testing has not detected any mercury leaching from the materials. In one example, a well-saturated fixed-bed sample of 15 wt %-brominated sorbent was mixed with ash to 0.9 $\mu g$ Hg/g fly ash, a representative amount for a pulverized-coal boiler, and sent to an outside laboratory for leachate testing. An additional fly-ash blank and a sample incorporating a representative amount of spray dryer waste were included for comparative purposes. The TCLP results were all below the laboratory's detection limits:

| Sample | Leachate Hg |
| --- | --- |
| Fly ash (baseline) | <0.010 mg/L |
| Fly ash + $Br_2$-PAC Sorbent | <0.010 mg/L |
| Fly ash + $Br_2$-PAC Sorbent + S.D. Waste | <0.010 mg/L |

For perspective, the U.S. EPA drinking water standard for mercury is 0.002 mg/L.

What is claimed is:

1. A method for removing mercury and mercury-containing compounds from a combustion gas in an exhaust gas system, comprising the steps of:

providing a mercury sorbent that has been prepared by treating a carbonaceous substrate with an effective amount of a bromine-containing gas for a sufficient time to increase the ability of the carbonaceous substrate to adsorb mercury and mercury-containing compounds;

injecting the mercury sorbent into a stream of the mercury-containing combustion gas for a sufficient time to allow an effective amount of the mercury and mercury-containing compounds in the combustion gas to adsorb onto the mercury sorbent; and collecting and removing the mercury sorbent from the combustion gas stream.

2. The method of claim 1, wherein:

the bromine-containing gas comprises elemental bromine.

3. The method of claim 2, wherein:

the carbonaceous substrate comprises activated carbon.

4. The method of claim 3, wherein:

the carbonaceous substrate or mercury sorbent is reduced to a particle size distribution that is fluidizable in the combustion gas stream.

5. The method of claim 2, wherein:

the carbonaceous substrate or mercury sorbent is reduced to a particle size distribution that is fluidizable in the combustion gas stream.

6. The method of claim 1, wherein:

the bromine-containing gas comprises hydrogen bromide.

7. The method of claim 6, wherein:

the carbonaceous substrate comprises activated carbon.

8. The method of claim 7, wherein:

the carbonaceous substrate or mercury sorbent is reduced to a particle size distribution that is fluidizable in the combustion gas stream.

9. The method of claim 6, wherein:

the carbonaceous substrate or mercury sorbent is reduced to a particle size distribution that is fluidizable in the combustion gas stream.

10. The method of claim 1, wherein:

the carbonaceous substrate comprises activated carbon.

11. The method of claim 10, wherein:

the carbonaceous substrate or mercury sorbent is reduced to a particle size distribution that is fluidizable in the combustion gas stream.

12. The method of claim 1, wherein:

the preparation of the mercury sorbent is done at a temperature greater than 60° C.

13. The method of claim 12, wherein:

the preparation of the mercury sorbent is done at a temperature greater than about 150° C.

14. The method of claim 13, wherein:

the carbonaceous substrate or mercury sorbent is reduced to a particle size distribution that is fluidizable in the combustion gas stream.

15. The method of claim 12, wherein:

the carbonaceous substrate or mercury sorbent is reduced to a particle size distribution that is fluidizable in the combustion gas stream.

16. The method of claim 1, wherein:

the carbonaceous substrate or mercury sorbent is reduced to a particle size distribution that is fluidizable in the combustion gas stream.

17. The method of claim 1, wherein:

the bromine-containing gas comprises elemental bromine, the carbonaceous substrate comprises activated carbon, the preparation of the mercury sorbent is done at a temperature greater than 60° C., and the carbonaceous substrate or mercury sorbent is reduced to a particle size distribution fluidizable in the combustion gas stream.

18. The method of claim 1, wherein the adsorbing of the mercury and mercury-containing compounds in the combustion gas onto the mercury sorbent takes place at a temperature between about 300° C. and about 400° C.

19. A process for manufacturing a mercury sorbent, comprising:

providing a carbonaceous substrate;

providing a bromine-containing gas; and contacting the carbonaceous substrate with the bromine-containing gas for a sufficient time to increase the mercury adsorbing ability of the carbonaceous substrate;

to provide a brominated mercury sorbent capable of adsorbing mercury in a high temperature combustion gas.

20. The process of claim 19, wherein:

the bromine-containing gas comprises elemental bromine.

21. The process of claim 19, wherein:

the bromine-containing gas comprises hydrogen bromide.

22. The process of claim 19, wherein:

the carbonaceous substrate is activated carbon.

23. The process of claim 19, wherein:

the contacting step occurs at a temperature greater than 60° C.

24. The process of claim 23, wherein:

the contacting step occurs at a temperature greater than about 150° C.

25. The process of claim 19, further comprising the step of:

reducing the particle size distribution of the carbonaceous substrate or mercury sorbent to a distribution fluidizable in the ductwork of a combustion gas stream.

26. The process of claim 25, wherein:

the bromine-containing gas comprises elemental bromine, the carbonaceous substrate comprises activated carbon, and the contacting step occurs at a temperature above 60° C.

27. A mercury sorbent prepared according to the process of claim 26.

28. The process of claim 19, wherein the brominated mercury sorbent is brominated to less than about 3 weight percent bromine.

29. The process of claim 19, wherein the brominated mercury sorbent is capable of adsorbing mercury in a combustion gas at a temperature greater than 150° C.

* * * * *